Stanley J. Mikina
C. H. Jones
INVENTORS

Stanley J. Mikina
C. H. Jones

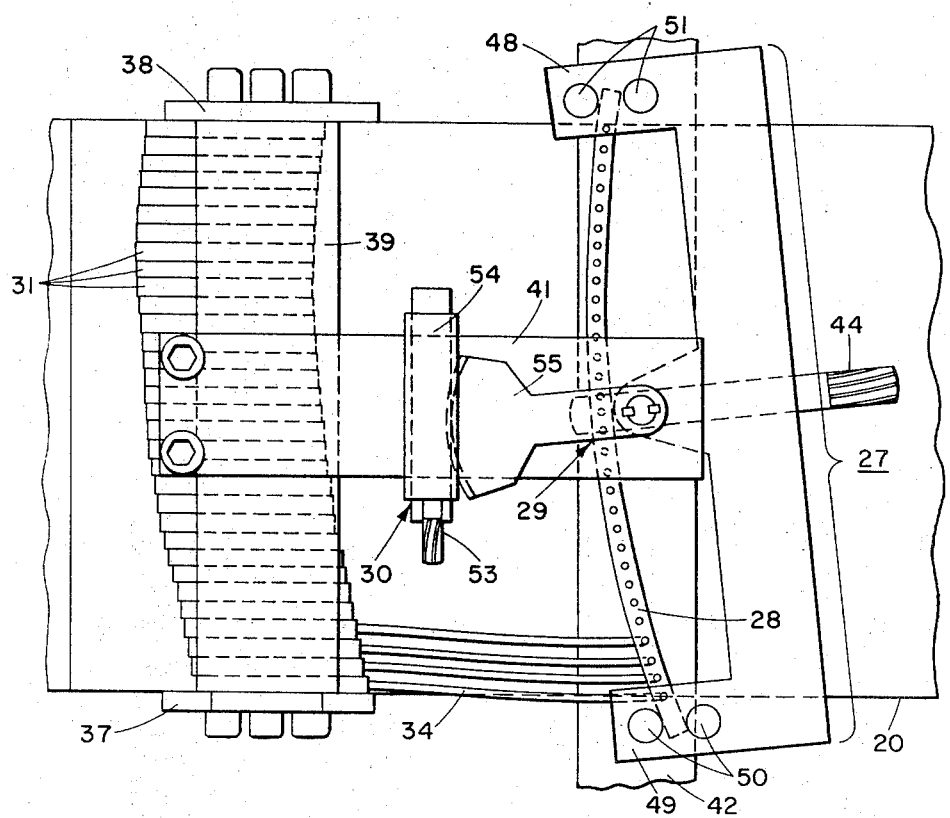
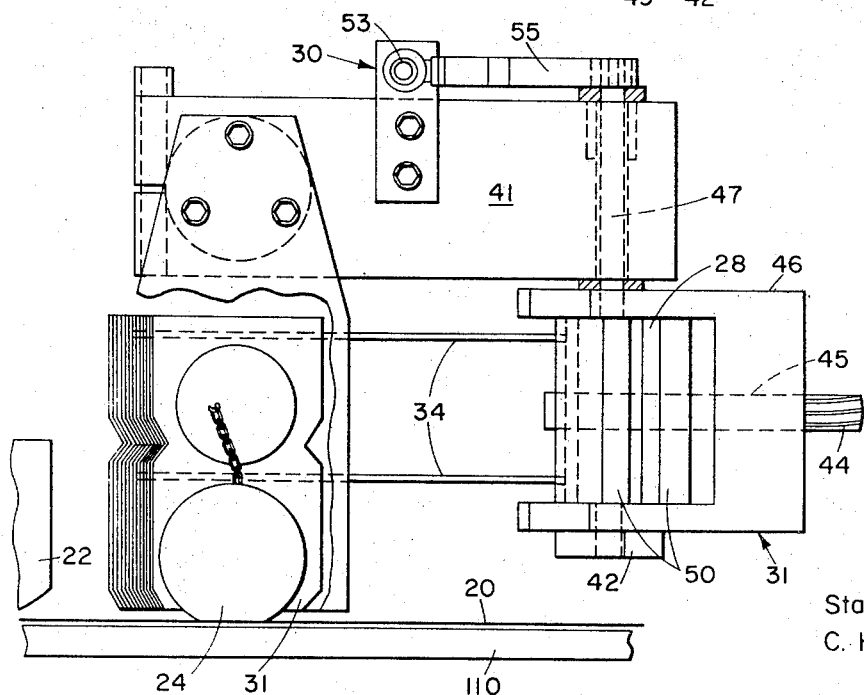

Stanley J. Mikina
C. H. Jones

Stanley J. Mikina
C. H. Jones

Stanley J. Mikina
C. H. Jones
INVENTORS

United States Patent Office 3,541,501
Patented Nov. 17, 1970

---

3,541,501
SIGNAL PROCESSING UNIT FOR ANALOG SCANNER
Stanley J. Mikina, Penn Hills, Pittsburgh, and Charles H. Jones, Murrysville, Pa., assignors, by mesne assignments, to the United States of America as represented by the Secretary of the Navy
Filed Mar. 29, 1967, Ser. No. 627,591
Int. Cl. G01s 3/00
U.S. Cl. 340—6
8 Claims

ABSTRACT OF THE DISCLOSURE

A signal processing unit is provided for individually recording on magnetic tape signals arriving from a plurality of receiving elements such as a vertical array of transducers. A record head is connected to each transducer and is adjustable by wires attached to a catenary-simulating strip for duplicating the attitude of the transducer array. Single and multiple readout heads are provided each capable of being angularly oriented with respect to the magnetic tape to duplicate delay lines representing wave fronts arriving from or departing at selected directions. The multiple heads are skewed with respect to one another to simultaneously process signals corresponding to a respective number of directions. The same device can also be used for forming transmitting beams.

---

The invention described herein may be manufactured and used by or for the Government of the United States of America for governmental purposes without the payment of any royalties thereon or therefor.

The present invention relates to delay lines and recording media for signal processing equipment and more particularly to such delay lines and recording media using mechanical means for processing signals with respect to antenna arrays subject to deviation from the normal.

In beam forming and beam steering sonar systems, a plurality of transducers are employed in a fixed array whereby incoming acoustic energy is capable of impinging on all transducers. In order to determine the direction of the incoming acoustic energy, the signal from all transducers must each be delayed an appropriate amount and then all of the signals can be combined. Since sonar signals from several directions may arrive at the array simultaneously, the sensing device should be adapted to determine the angle of approach of each source of energy.

Where a linear array is suspended on a cable or other line as for example from a ship or submarine, the array when lowered to any significant depth is subject to displacement, e.g. curvature, by ocean currents, the motion of the supporting vessel and other ambient disturbances. Curvature in the line connecting the array members introduces considerable error into the recording means used. This error may be compensated for by the use of delay means such as inductance-capacitance lines, phase splitters or transformers with resistive summing networks, digital-shift-register delay lines, or delay means involving the use of a moving body upon which the information can be stored or recorded.

The first three of the foregoing delay means are more electrical than mechanical and are subject to many disadvantages such as weight and high cost, degradation by noise of the signals received, limited bandwidth and the appearance of ghost targets among other undesired results. Beamforming involving a magnetic tape storage medium, such as is used in connection with the present invention, avoids most of the disadvantages of the other types of delay lines and is readily adaptable to compensate for tilting and/or curving of the arrangement of recording heads to correspond to tilting and/or curving of the transducer array.

Briefly, the present invention provides a device for use with a magnetic recording system wherein a plurality of recording heads may be set to form an angle which simulates the chord angle of the transducer cable catenary. Each individual recording head may be selectively displaced wiht respect to adjacent heads to simulate deflections of the transducer cable catenary from the center of the chord. Read heads, preferably six in number, are disposed in a fan-like array with the array reciprocable through a selected arc to enlarge the scope of the device.

Accordingly, it is an object of the present invention to provide recording and readout means for a magnetic tape recording system wherein tilting and/or curving of the array of receiving elements may be simulated at the recorder.

Another object of this invention is to provide in a magnetic tape recording system, readout means for reading the information relayed from a plurality of transducers whereby the direction of received energy may be detected by rotation of the readout magnetic heads.

A further object of the invention is to provide a method for supporting a plurality of record heads on a magnetic tape in such a way that their lateral position can be adjusted to conform to tipping and bending of a linear array of transducers while allowing each of the individual heads to be individually supported in spring-loaded contact with the tape.

A further object of the invention is to provide a method of driving an array of magnetic reading heads so that the array can be rotated at substantially a constant angular rate through an angle on the order of the angle between the heads, and then quickly returned to the starting position.

Other objects, advantages and novel features of the invention will become apparent from the following detailed description thereof when considered in conjunction with the accompanying drawings in which like numerals represent like parts throughout and wherein:

FIG. 3 is a plan view of an embodiment of the invention for simulating deviation from the normal attitude of the array suspension line;

FIG. 4 is an end view partly in section of the embodiment shown in FIG. 3;

Figure 1:
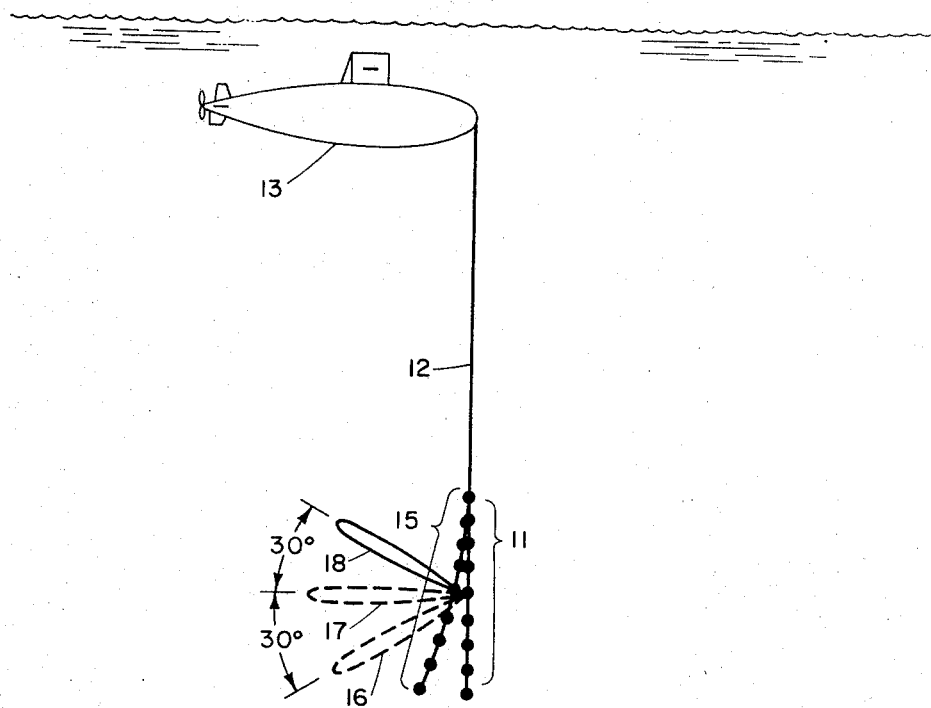
FIG. 1 is a schematic view showing a transducer array suspended in an operating position.

Referring to FIG. 1, there is shown an array of signal receiving and/or transmitting elements 11 suspended by a cable 12 from a movable supporting means such as submarine 13. Array 11 is shown in phantom at 15 to indicate a repersentative deviation caused by movement of the medium with respect to the submarine in which the array is suspended. The curvature of array 15 could also be produced by motion of the supporting vessel or by a combination of vessel motion and motion within the medium at the level of the array of elements. The envelopes 16, 17 and 18 represent both acoustic beams which may be transmitted by the array or received signals impinging on the array from the directions indicated.

Figure 2:
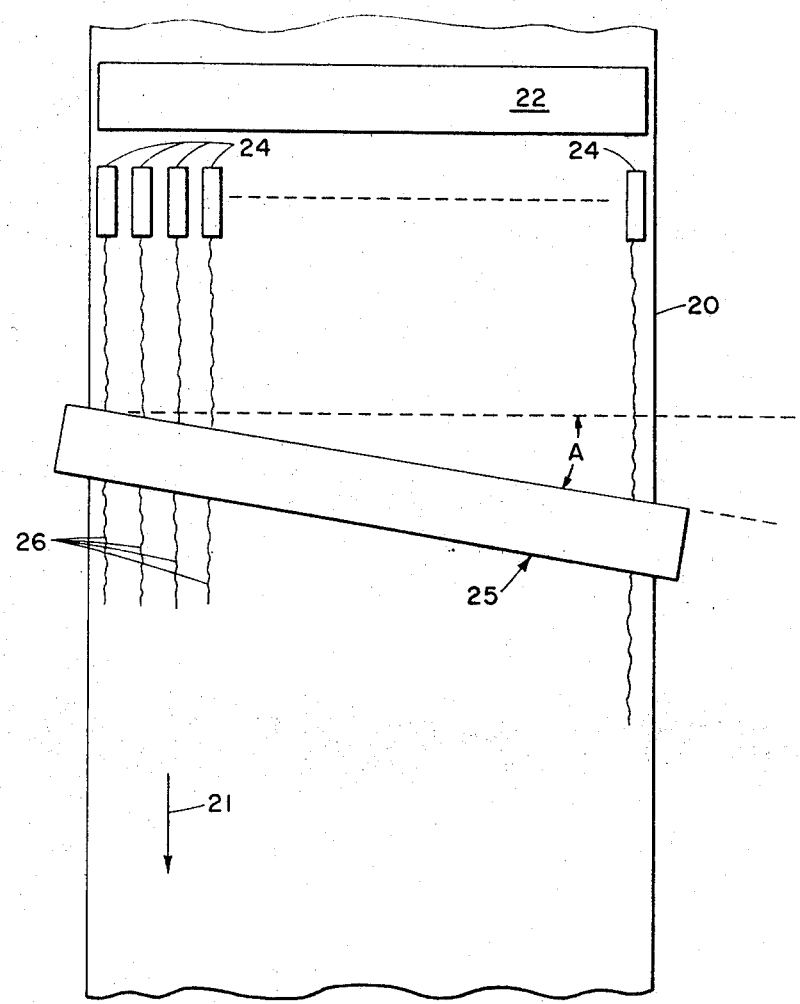
FIG. 2 is a schematic view of the primary components of the magnetic tape delay line analog of the present invention.

In FIG. 2, the general arrangement of the components of this embodiment of the magnetic tape transport mechanism is shown and includes a magnetic tape 20 adapted for movement in a direction indicated by arrow 21. Tape 20 first passes under an erase head 22 and then under a plurality of record or write heads 24 disposed in this figure in a straight line which would represent array 11 in a precisely vertical attitude in FIG. 1. A single readout head 25 is positioned over tape 20 a selected distance from the record heads 24 and is skewed at an angle A so as to span all of the signal tracks 26 of recorded information. Readout head 25 is rotatable to assume different skew angles with respect to a line transverse to magnetic tape 20 and may be replaced by a plurality of individual heads each disposed angularly with respect to the other. The sum of the individual recording tracks 26 produced by the record heads 24 are read by the readout head 25. A number of readout heads at different angles may be employed as will be described infra.

A composite record head assembly 27 shown in FIGS. 3 and 4, includes means such as a flexible strip or band 28 which is adapted to being bent in a variety of curvatures by deflection means 29 and to be varied in azimuth by worm drive means 30. Each of the individual record heads 24 is held in a respective holder 31 which is connected to band 28 by at least a pair of resilient means such as wires 34. These wires are spaced apart vertically so as to more accurately apply resilient pressure to each of record heads 24 through holders 31 thereby maintaining the record heads in contact with magnetic tape 20. The record heads 24 and holders 31 are positioned adjoining one another and are maintained in place laterally by two end plates 37 and 38 which have a sufficient length along the direction of tape movement to provide an adequate abutting surface at various longitudinal positions of the end record heads and holders. The end plates preferably are connected together by rod 39 to provide rigidity. Rod 39 confines the record heads 24 at a desired friction contact with one another so as to maintain the heads in a parallel relationship during various positions induced by movement of deflection means 29 and worm drive means 30.

Worm drive means 30 introduces an angle proportional to the chord angle of the caternary of support cable 12, while deflection means 29 introduces deflection of the array to simulate bending of the chord. A bar 41 supports rod 39 and maintains the rod and end plates 37 and 38 in alignment with respect to tape 20. Bar 41 is fixedly attached to a crosspiece 42 which in turn is attached to a support frame, not shown. Deflection means 27 includes a screw 44 which is secured to flexible strip 30 and passes through a threaded hole 45 in a steering and support yoke 46 so that turning screw 44 in one direction will force strip 28 to the left in FIG. 3 and in the opposite direction to the right. Bar 41 carries a shaft 47 extending downward and supporting deflection means 29. Shaft 47 also supports yoke 46 which is provided with end sections 48 and 49 each extending toward record heads 24. End sections 48 and 49 are cutaway to accommodate pairs of pins 50 and 51, respectively, disposed at opposite ends of the yoke, which pins are selectably spaced apart to receive the respective ends of flexible strip 28. Strip 28 extends lengthwise through the space between the pins a sufficient distance to permit its being bowed by deflection means 29 to the maximum deflection anticipated of the transducer array cable catenary from the center of the chord. Worm drive means 30 is attached to bar 41 and includes a screw 53 which is attached to and turns a worm gear 54. Gear 54 engages threads on an arm 55 which is fixedly attached to yoke 46 so that upon turning screw 53 arm 55 will be driven in the direction of either pins 50 or pins 51 thereby rotating the yoke and the deflection means about the axis of shaft 47.

Record heads 24 in the position shown in FIGS. 3 and 4 can be seen to form a curved line which corresponds to the curved flexible strip 28, the curvature of which corresponds to the caternary of cable 12 which is desired to be simulated. Wires 34 provide both support for the record heads as well as positioning each record head with respect to the relative position of the flexible strip 28. The majority of the weight of the record heads 24 is carried by wires 34, the wires being secured in such a manner as to suspend their respective record head in light contact with tape 20.

Figure 5:
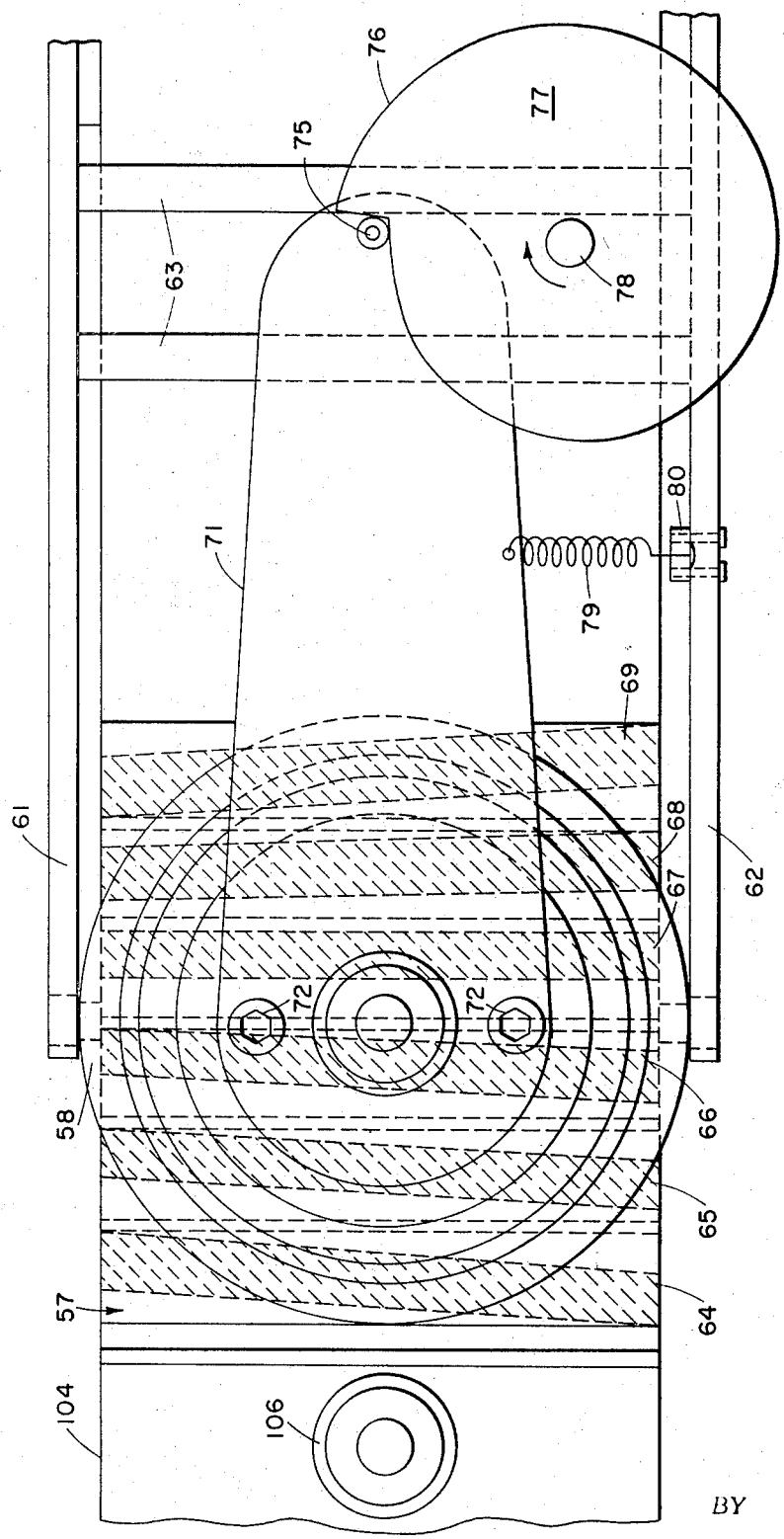
FIG. 5 is a plan view of an embodiment of the tape readout means of the present invention taken along a line substantially corresponding to line 5—5 in FIG. 6.
Figure 6:
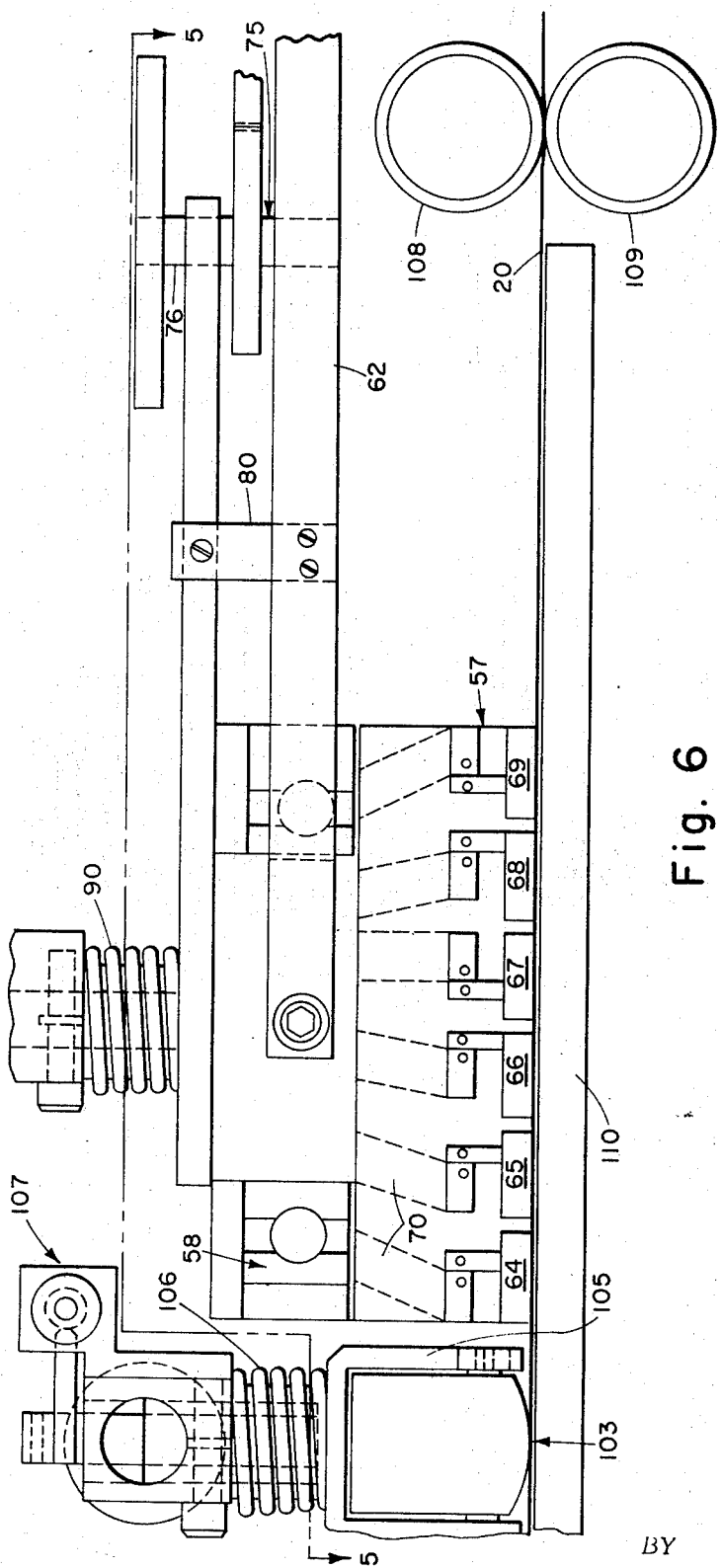
FIG. 6 is a side elevation of the tape readout means.

A composite readout head assembly, shown in FIGS. 5 and 6 includes a rectangular block 57 mounted for reciprocating movement in a ball bearing assembly 58, the block and assembly being supported by a pair of longitudinally extended bars 61 and 62 which are attached to a suitable framework, not shown. Bars 61 and 62 may be stiffened by crosspieces 63. Block 57 both carries and includes a plurality of read out heads 64, 65, 66, 67, 68 and 69, each of which is fixedly mounted at an angle to the other. The relative angular position of the heads with respect to one another is indicated by broken lines 70 appearing above the heads in FIG. 6. Ball bearing assembly 58 permits rotation of block 60 and readout heads 64 through 69 upon movement of an elongate plate 71 to which the block and ball bearing assembly are attached by bolts 72. Plate 71 is provided with a stud 75 which extends above plate 71 a distance sufficient to abut the surface 76 of a cam 77 which is mounted on a drive shaft 78. Cam 77 and shaft 78 are supported by bars 61 and 62 with plate 71 connected for spring return by a spring 79 which is secured to a bracket 80 on bar 62. Cam 77 has a spiraling periphery such that as the cam is rotated by shaft 78 plate 71 is displaced laterally until the furthest radius of cam 77 is met after which further rotation of shaft 78 allows spring 79 to return stud 75 to the shortest radius of cam periphery 76.

Figure 7:
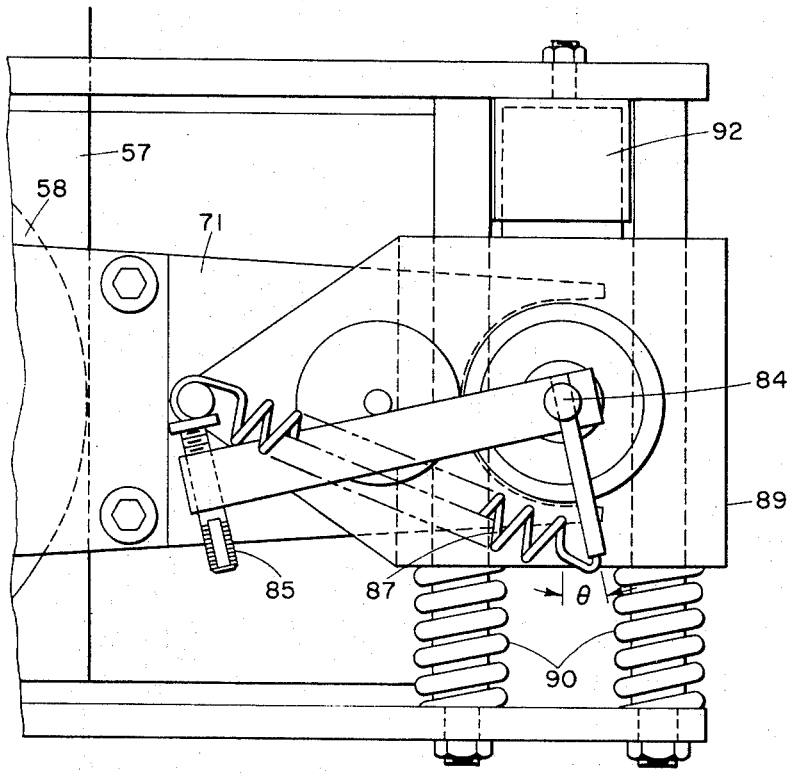
FIG. 7 is a plan view of an alternate embodiment for achieving automatic scan.
Figure 8:
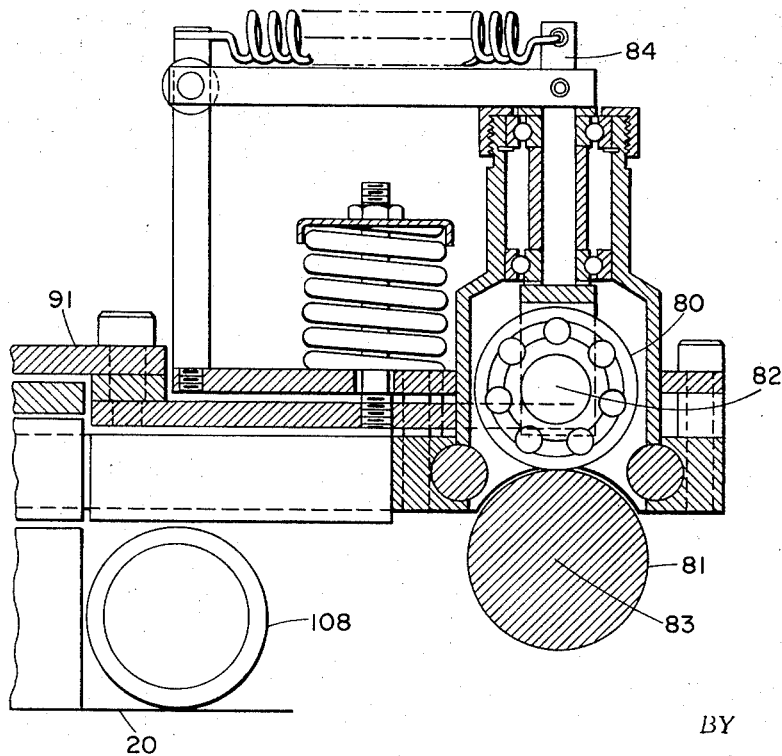
FIG. 8 is a side elevation of the embodiment of FIG. 7.

An alternative method of and means for obtaining automatic scan is shown in FIGS. 7 and 8 whereby elongate plate 71 is moved angularly on ball bearing assembly 58 by means of a drive wheel 80 that is pressed against a rotating scan drive shaft 81. The axis 82 of the drive wheel is at an angle with respect to drive shaft 81, causing wheel 80 to be displaced along drive shaft 81 like a non-rotating nut on a rotating screw. The velocity of this displacement is equal to $V \tan \theta$, where V is the peripheral velocity of drive shaft 81 and $\theta$ is the angle of the drive wheel axis 82 out of the plane formed by the drive shaft axis 83 and the pivot axis 84 of the drive wheel. The advantage of this construction is that it provides a means for continuously varying the scan speed by simply changing the angle $\theta$ which can be accomplished by means of an adjusting screw 85 on a lever 86 connected to pivot shaft 84 of drive wheel 80. A tension spring 87 on pivot shaft 84 holds angle adjusting lever 86 in contact with a reference point 88. Drive wheel 80 causes lateral movement of a scan carriage 89 against a pair of biasing springs 90. An electrical limit switch, not shown, positioned at the end stroke of carriage 89 causes an electromagnet 91 to be energized. A dashpot 92 is positioned adjacent scan carriage 89 to absorb shock.

Readout heads 64 through 69 are maintained in constant pressure against tape 20 by a spring 93 which is mounted coaxially over ball bearing assembly 58 and is attached to a support frame, not shown. Alternatively, single readout means are provided by a readout head assembly 103 which includes an elongate readout head 104 supported in a housing 105 and having contact pressure applied by a spring means 106 for maintaining head 103 in contact with tape 20. A worm drive means 107 is provided for selectively rotating readout head 103 to the desired skew angle A as indicated in FIG. 2. Pressure rolls 108 and 109 control tape movement through suitable drive means, not shown. A flat Micarta plate 110 may be disposed under the record and readout heads to provide a substantially frictionless smooth under surface for tape 20.

In operation of the embodiment of FIGS. 6 and 7, as the scan carriage 89 is driven to the end of its stroke, it also compresses the pair of biasing springs 90 which provide the force for carriage return. At the stroke end, the electrical limit switch causes electromagnet 91 to be energized to lift the drive wheel assembly from the surface of the drive shaft. The resulting loss of frictional tractive effort between the drive wheel and the drive shaft causes the compressed return springs 90 to propel the scan carriage back to its starting point very rapidly. At the end of the return stroke, the scan carriage velocity is reduced to zero over a small shock absorbing interval by means of dashpot 92 which provides a soft stop. De-energizing the electromagnet then causes a large helical biasing spring, not shown, to press drive wheel 80 against drive shaft 83 to begin another scan cycle.

In operation of all embodiments, either a continuous loop of magnetic tape or a long strip of tape which is unreeled and reeled in a conventional manner may be employed with the device. The tape in a preferred employment is four inches wide and is moved at a speed of seven and one-half inches per second. Tape 20 first passes under erase head 22 which removes any old information thereon and then passes successively under the thirty-two record or writing heads 24 shown in FIGS. 3 and 4. Each of the record holders 31 have polished sides so as to promote ease of movement relative to one another in response to movement of the respective stainless steel wires 34. After leaving the writing heads, tape 20 now carrying tracks 26 moves under rotatable readout head 103, which extends the full width of the tape, and reciprocable heads 64 through 69. The six readout heads 64 through 69 are rigidly mounted in a skewed relationship of substantially 3.75° divergence between successive heads. In the embodiments of FIGS. 5 and 6, drive shaft 78 is rotated at a constant speed of 2¼ r.p.m. to permit simultaneous processing of signals arriving from the transducers in array 11. The embodiment of FIGS. 7 and 8 is used where variation of scan speed is desired.

The device provides a method of and means for supporting a multiplicity of writing heads on a magnetic tape in such a way that their lateral position can be adjusted while allowing each of the individual heads to be individually supported in spring-loaded contact with the tape. The magnetic tape transport means is adaptable to receive signals at angles from 30° below to 30° above a plane normal to cable 12 in the center of array 11. The sum of signals recorded on the thirty-two signal tracks is read out by either single readout head 103 or the six readout heads in block 60. The magnetic gaps of the record heads are aligned perpendicular to the direction of tape motion and the sum of the signals recorded may be read out by heads wide enough to cover all thirty-two signal tracks simultaneously. Where the magnetic gap of the readout head or heads is not perpendicular to the direction of tape motion due to skewing of the readout heads, the travel time for the signal from record head to readout head is not the same for all signal tracks and varies in fixed amounts from track to track across the tape. The delays thus introduced into the hydrophone array channels have the effect of forming signals representing acoustic beams whose direction may be determined by the angle of the readout head.

A greater information rate can be achieved with a sonar or other similarly oriented system if several signal beams may be formed and examined simultaneously rather than a single beam. Simultaneous beams can be easily formed with the system of the present invention by using the additional readout heads 64 through 69 placed at appropriate angles on the tape. In the embodiments of FIGS. 5-8, inclusive, six independent simultaneous beams may be formed by the six readout heads which may be placed at appropriate angles and may automatically and selectively scan the tape so that the six beams are 10° apart. Since each beam may be scanned through a 10° angle, a 60° sector may be scanned in one-sixth the time required by a single head.

The invention can also be used in a beam forming device for transmitting energy rather than receiving it. When this is done the role of the record and readout heads is reversed and the direction of tape motion 21 is reversed. A pulse or C-W (continuous-wave) signal is fed to head 25 of FIG. 2. The angle of the head 25 will correspond to a desired direction in which a beam is to be formed in the water. Thirty-two signals are read-out from the thirty-two heads and are amplified and fed to the correspinding elements of the array to form a single beam in the water. Motion of head 25 will cause the beam to move. If six simultaneous beams are desired each having a different frequency and direction, then the six signals are fed to the six heads 64 to 69 of FIG. 5. Motion of all of these heads by cam 77 will scan all six beams.

Obviously many modifications and variations of the present invention are possible in the light of the above teachings. It is therefore to be understood that within the scope of the appended claims the invention may be practiced otherwise than as specifically described.

What is claimed is:

1. A magnetic tape transport mechanism having a record head assembly capable of being tilted and bent to compensate for tilting and bending of an array of signal receiving and/or transmitting elements comprising:
   a plurality of record heads adapted for individual movement in the direction of travel of the magnetic tape;
   flexible means adapted to substantially conform to selected curvatures in said array of elements; and
   resilient means connecting individual ones of said record heads to said flexible means;
   whereby bending or tilting of said flexible means will align said record heads according to the curvature of said flexible means and said resilient means will maintain said record heads in contact with the magnetic tape.

2. Apparatus for correcting at a remote station deviations from the normal of an array of signal receiving elements comprising:
   a plurality of record means each connected to a respective one of said signal elements;
   a storage means disposed for linear movement adjacent to said record means;
      said record means positioned adjacent one another in slidable relationship substantially across the surface of said storage means so as to form thereon parallel tracks of signal information;
   means connected to each of said record means for selectively displacing said record means as a function of the attitude assumed by said signal elements;
   said connecting means including a flexible reference means adapted to be curved so as to assume curvature of said array of signal elements, and
      said reference means further adapted for azimuthal orientation so as to represent the chord angle of the curvature of said array of signal elements.

3. A device as defined in claim 2 wherein said flexible reference means is a metal plate mounted for bending in a yoke;
   said yoke mounted for rotation about an axis centrally disposed with respect to said storage means; and
   said connecting means being resilient and adapted to maintain said record means in juxtaposition with said storage means.

4. A device as defined in claim 3 wherein said connecting means is at least a pair of resilient wires.

5. Apparatus for correcting at a remote station deviations from the normal of an array of signal receiving elements comprising:
   a plurality of record means each connected to a respective one of said signal elements;
   a storage means disposed for linear movement adjacent to said record means;

said record means positioned adjacent one another in slidable relationship substantially across the surface of said storage means so as to form thereon parallel tracks of signal information;

means connected to each of said record means for selectively displacing said record means as a function of the attitude assumed by said signal elements;

readout means disposed so as to span the tracks of signal information on said storage means;

said readout means resiliently mounted in juxtaposition with the surface of said storage means;

said readout means mounted for rotation about an axis centrally disposed with respect to said storage means;

said readout means including the plurality of readout heads mounted in fixed relationship in a frame adapted for rotation about an axis perpendicular to the surface of said storage means;

means for reciprocating said frame about said axis to selected skew angles of said readout heads with respect to the tracks of signal information on said storage means;

said reciprocating means including an arm secured to said frame;

cam means abutting a projection of said arm so as to produce selected rotary movement thereof about said axis; and resilient means connected to said arm for constraining the arm to follow the periphery of said cam.

6. Apparatus for correcting at a remote station deviations from the normal of an array of signal transmitting elements comprising:

a plurality of readout means each connected to a respective one of said signal elements;

a storage means disposed for linear movement adjacent to said readout means;

said readout means positioned adjacent one another in slidable relationship substantially across the surface of said storage means so as to form thereon parallel tracks of signal information;

means connected to each of said readout means for selectively displacing said readout means as a function of the attitude assumed by said signal elements;

said connecting means including a flexible reference means adapted to be curved so as to assume the curvature of said array of signal elements; and said reference means further adapted for azimuthal orientation so as to represent the chord angle of the curvature of said array of signal elements.

7. A device as defined in claim 6 wherein said flexible reference means is a metal plate mounted for bending in a yoke;

said yoke mounted for rotation about an axis centrally disposed with respect to said storage means; and said connecting means being resilient and adapted to maintain said readout means in juxtaposition with said storage means.

8. A device as defined in claim 7 wherein said connecting means is at least a pair of resilient wires.

References Cited

UNITED STATES PATENTS

| | | | |
|---|---|---|---|
| 2,825,043 | 2/1958 | Abbott | 340—16 |
| 3,020,521 | 2/1962 | Salvatori et al. | |
| 3,039,079 | 6/1962 | Walters et al. | 340—6 |
| 3,316,530 | 4/1967 | Hopkin et al. | 340—6 X |

FOREIGN PATENTS

| | | |
|---|---|---|
| 1,422,061 | 11/1965 | France. |

RICHARD A. FARLEY, Primary Examiner